United States Patent Office 3,400,748
Patented Sept. 10, 1968

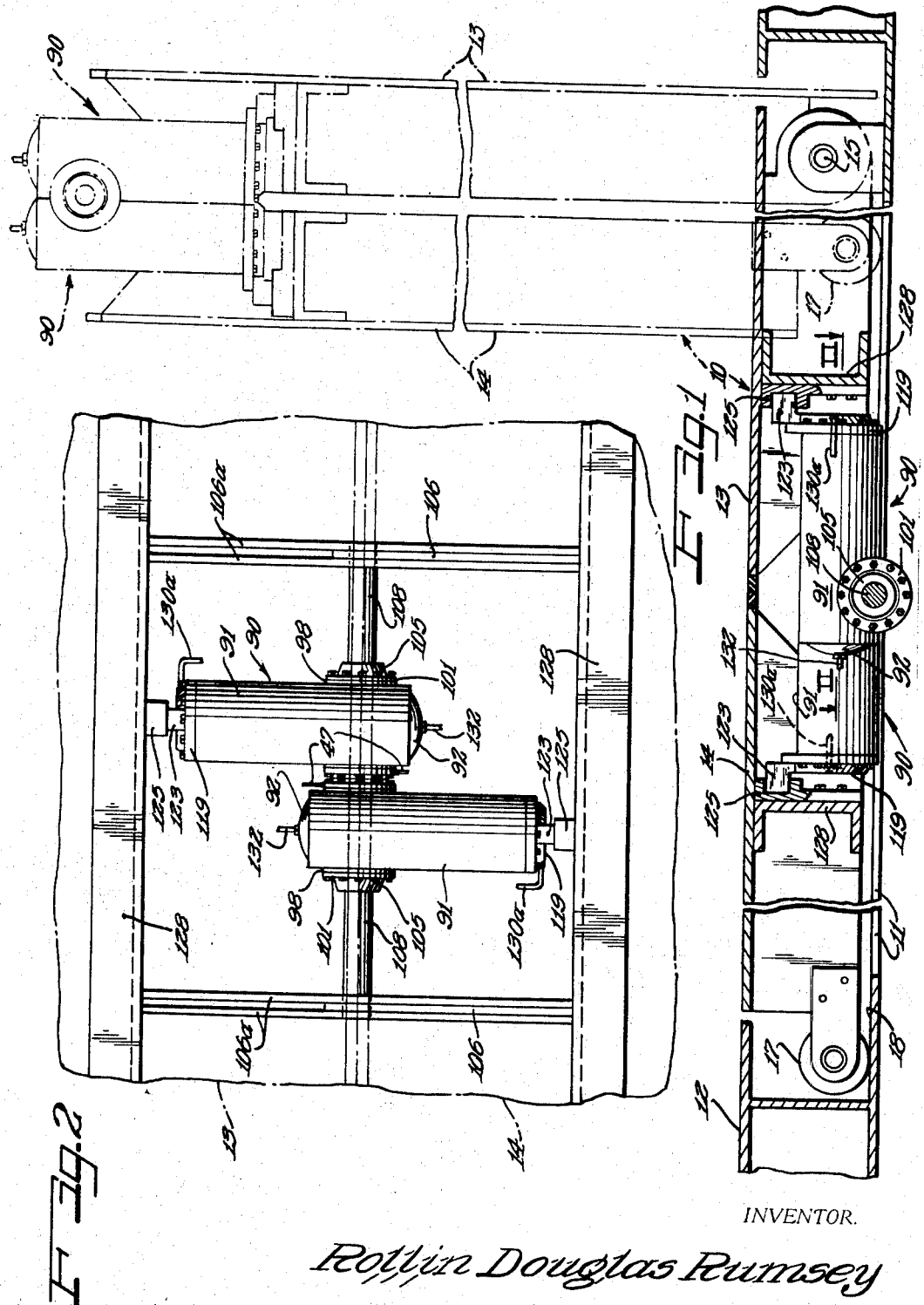

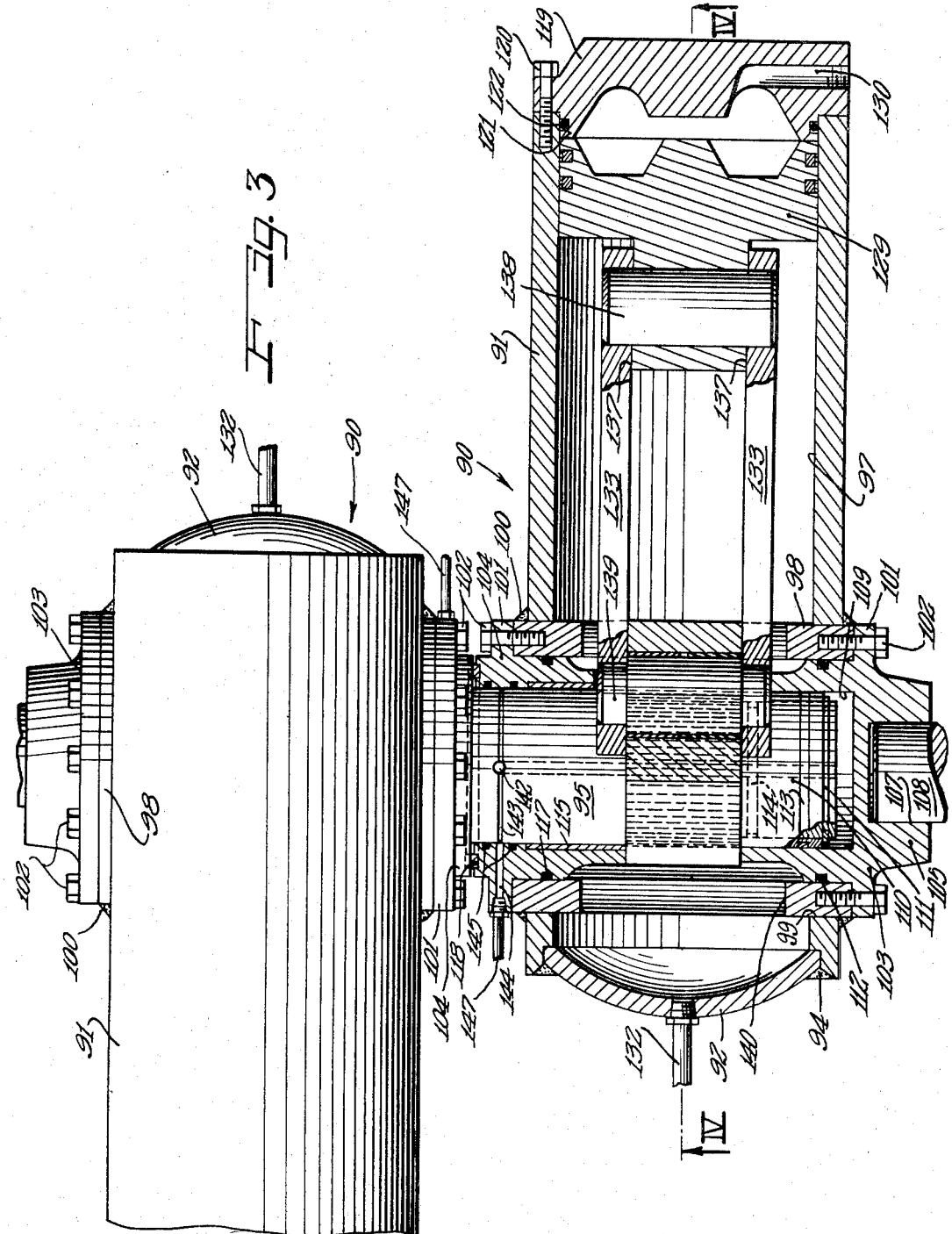

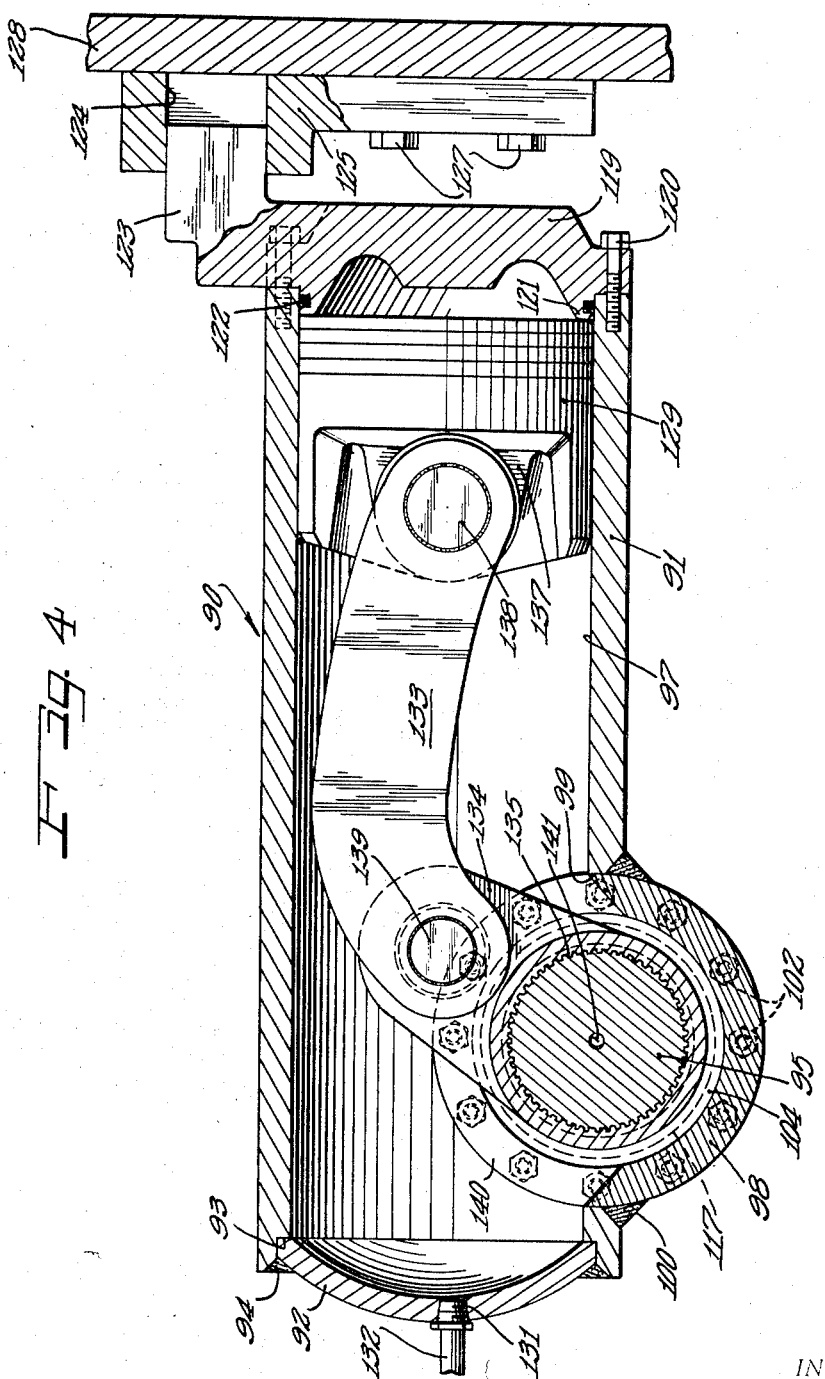

3,400,748
HATCHWAY COVERS AND PISTON LEVER
HATCH ACTUATORS THEREFOR
Rollin Douglas Rumsey, Buffalo, N.Y., assignor to Houdaille Industries, Inc., Buffalo, N.Y., a corporation
Original application July 6, 1966, Ser. No. 563,257, now Patent No. 3,370,638, dated Feb. 27, 1968. Divided and this application Dec. 1, 1967, Ser. No. 687,309
10 Claims. (Cl. 160—188)

ABSTRACT OF THE DISCLOSURE

Hatchway covers and the like are operated by rotary actuators of the piston lever type each of which comprises a one-piece tubular cylinder having respective opposite end closures defining with a piston reciprocable therein pressure fluid chambers into which pressure fluid is introduced for motivating the actuators. A hollow transverse head member comprising a piece of tubing is welded in an opening in the cylinder and journals a shaft to which the piston is connected by link means.

This is a division of application Ser. No. 563,257, filed July 6, 1966, now Patent No. 3,370,638.

This invention relates to novel piston lever actuator means for efficient power operation of relatively heavy closures such as hatch covers, doors, and the like, between open and closed positions.

For heavy duty closures such as hatch covers of cargo vessels, bulkhead doors, and the like involving heavy movable panels or sections, hydraulic rotary actuators, and more particularly piston lever actuators are highly desirable. Heretofore, quality steel alloy castings have been employed successfully in the body or housing portions of the actuators. These castings have been constructed to withstand very high bursting pressures. As a practical matter, however, by at least currently practiced metal casting techniques, great difficulty has been experienced in procuring pressure-proof hollow castings free from porosity, slag inclusions, shrink pockets and cracks. Hence, the castings have been an excessive cost factor in these actuators.

It is therefore an important aim of the present invention to eliminate metal castings in the housing bodies of heavy duty piston lever rotary actuators and effect substantial cost reductions therein.

Another object of the invention is to provide a novel piston lever rotary actuator comprising an advantageous combination of high strength tubular steel parts.

A further object of the invention is to provide a piston lever rotary actuator of the character described having a novel balanced torque piston arrangement.

Yet another object of the invention is to provide a novel piston lever rotary actuator construction employing entirely high strength alloy steel tubing in the housing body at a substantial reduction in cost as compared to castings.

Among additional objects of the invention are the provision of simplifications in construction, reduction in weight, more compact size, simpler sealing against leakage, novel new means to facilitate assembly, and the attainment of substantial economies in overall costs.

According to the principles of the invention, an actuator adapted for such means as operating a hatch cover has a tubular housing providing a cylinder within which a piston is relatively slidably reciprocably mounted between closure members on the ends of the cylinder and defining actuating pressure fluid chambers with the opposite ends of the piston. A hollow tubular head is assembled with the housing and has a shaft journaled on an axis offset from and transverse to the axis of the piston, with a torque arm lever on the shaft connected by a link to the piston. The cylinder end nearest the hollow head is an attachment to the end of the housing tube in closing relation thereto and adjacent to an opening in the wall of the housing tube within which the head member is secured as by means of welding in fluid-tight relation.

Other objects, features and advantages of the present invention will be readily apparent from the following detailed description of a preferred embodiment thereof taken in conjunction with the accompanying drawings, in which:

FIGURE 1 is a generally schematic sectional elevational view showing a hatch cover installation embodying features of the invention:

FIGURE 2 is a plan view of the actuators and supporting frame of the hatch cover of FIGURE 1;

FIGURE 3 is an enlarged fragmentary section and plan view taken substantially along the line III—III of FIGURE 1; and FIGURE 4 is a longitudinal sectional view taken substantially along the line IV—IV of FIGURE 3.

On reference to FIGURE 1, a hatch cover assembly 10 is mounted for closing disposition over a hatchway or opening 11 within a ship deck 12, or the like. In this instance, the hatch cover 10 comprises two complementary cover panel sections 13 and 14, with the section 13 pivotally mounted along one edge to the deck beam structure, as indicated at 15. On the other cover section 14 are antifriction roller means 17 arranged to ride track means 18 provided by the deck frame along the opening 11. Through this arrangement, the cover panel sections 13 and 14 are adapted to lie in coplanar side-by-side relation closingly over the hatchway 11, as shown in full outline in FIGURE 1, and are adapted to be moved into a folded booked open position relative to one another and to the deck 12, as shown in dot-dash outline. Although the hatch cover 10 is shown as comprising only a pair of cover panels, the principles of the invention are adapted for multiples of such paired panels or sections for long hatchway openings. In addition, certain principles of the invention are adapted for operating single section closures such as hatch covers, and the like, between closed and open positions, as will be evident.

Improved means for actuating the cover sections 13 and 14 between the hatchway closing and hatchway open positions comprise powered hinge means including a pair of rotary actuators 90 mounted on the respective cover sections and coupled for synchronized operation. Although a coupled pair of the actuators 90 is shown and which may suffice for a hatch cover 10 which is relatively narrow, in a wider cover assembly a plurality of such pairs of actuators may be utilized along the hinge joint of the panels.

Each of the actuators 90 is of the piston-lever rotary type.

In a rugged, lightweight, economical and efficient construction, each of the piston lever actuators 90 has a housing body constructed both in the head and lever cylinder portions thereof from high strength alloy steel tubing. To this end, a straight tube 91 of suitable wall thickness and diameter is of sufficient length to provide both the head and lever cylinder portions of the actuator unit. At its head end the body tube 91 is permanently closed by a preferably concave convex closure dome 92 which may conveniently comprise a pressed high strength steel member. Mounting of the head closure dome 92 is effected by seating it in an inside annular rabbet groove 93 in the head end margin of the body tube and then line welding the pieces together as indicated at 94 into a pressure-tight unitary assembly.

For journalling the head portion of the actuator 90 to rotate about a shaft 95 on a transverse axis offset relative to the axis of a cylindrical working chamber 97 defined by the housing tube 91, a transverse head journal tube 98 is secured in pressure-tight relation to the body tube 91. To this end, the tube 91 is provided with a semi-cylindrical cutout 99 extending transversely across the head end portion thereof, and the journal member tube 98 is secured in such cutout as by means of welding 100. At its opposite ends, the journal tube 98 projects to a limited extent beyond the outer perimeter of the body tube 91 and presents squared ends against which are secured respective annular attachment flanges 101, as by means of screws 102, of respective combination and closure and bearing cap and adapter hub members 103 and 104, respectively.

The cap member 103 is secured to that end of the tube 98 which is remote from the companion actuator 90 on the shaft 95 and has an outwardly projecting annular flange 105 providing a socket 107 within which is engaged in torque-free relation one end portion of a coupling hinge pin 108 extending coaxially with the shaft 95. At its other end portion, the pin 108 couples respective hinge bars 106 and 106A rigid with the respective hatch cover sections 13 and 14.

Inwardly from the flange 101, the cap member 103 is telescopically fitted into the associated end portion of the head tube 98 and provides an inwardly opening blind end journal bore 109 within which the free end of the shaft 95 is journalled, with a self-lubricating bushing bearing 110 engaged about the journal end portion of the shaft and retained in predetermined axial relation thereon by a snap ring 111. External leakage past the cap 103 is prevented by a high pressure static annular seal 112. Leakage past the journal end portion of the shaft is minimized by annular high pressure seals 113 and 114.

At the opposite end of the head tube 98, the combination end closure and shaft journal member 104 is telescopically engaged within the tube inwardly from the attachment flange 101 and defines a substantial length journal hub supporting a self-lubricating bushing bearing 115. A static high pressure annular seal 117 prevents leakage between the member 104 and the head tube. Outwardly from the attachment flange 101, the member 104 closely confronts the corresponding end of the closure and journal member 104 of the companion actuator 90, and an annular dust seal 118 is desirably embedded in the confronting end faces of the member 104 to bridge across the slight gap therebetween.

Although each of the cooperatively paired actuators 90 may have a separate shaft 95, with the shafts secured in relatively fixed non-rotatable relation, a compact arrangement, as shown, has the shaft 95 common to both of the actuators. The construction and relationship and operation of the actuators 90 is such that by hydraulic motivation of the actuators to effect relative opposite swinging movements of the acuators about the shaft 95 opening or closing torque is selectively applied to the hatch cover sections 13 and 14.

At its opposite or tail end, the body tube 91 is closed by a high pressure cover or closure member 119 which may comprise a forged steel flange member of a diameter to overlie the end of the body tube to which it is secured as by means of screws 120 with an annular flange 121 extending inwardly telescopically into the end portion of the body tube and sealed against leakage by a high pressure static annular seal 122. A rugged integral rearwardly projecting boss 123 on the perimeter of the closure member 119 affords means for securing the actuator to the associated hatch cover panel or the like. A complementary socket 124 receives the attachment boss 123 in a bracket 125 secured as by screws 127 to a frame member 128.

For generation of cranking torque in the actuator 90, a hydraulically motivated piston 129 is reciprocably mounted within the cylinder 97 and is arranged to have hydraulic pressure fluid impressed upon its free head end or crown which opposes the closure member 119, hydraulic pressure being introduced by way of a passage 130 leading into one edge of the end closure and communicating at its inner end with the space between the end closure and the piston. At its outer end the passage 130 is connected with a conduit 130a which communicates with a suitable source of hydraulic pressure in a hydraulic control system to effect pressurized separation of the end closure 119 and the piston head 129 to operate the actuator for opening of the associated hatch cover, and, alternatively, drainage during closing of the hatch cover. Alternatively, hydraulic pressure fluid is arranged to be impressed upon the opposite or inner end of the piston from the head chamber of the actuator and entering through a port 131 in the head end closure 92 with which communicates a suitable hydraulic conduit 132 connected with the hydraulic control system for introducing hydraulic fluid to effect return or closing movement of the hatch covers by motivation of the actuators 90 and to bleed off hydraulic fluid during opening and raising of the covers.

Torque thrust reaction between the cylinder tube 91 and the piston 129 is enabled by connection of the piston by means of piston rod linkage 133 to a torque arm 134 keyed fixedly as by means of splines 135 to the shaft 95 and maintained in an upwardly and rearwardly directed aligned relation across the axis of cylinder 97, as shown in FIG. 4, between the inner confronting ends of the journal hub flanges provided by the combination closure and journal members 103 and 104. By preference, the piston rod linkage 133 comprises a pair of link members slidably coupled in pivotal relation to opposite parallel slabbed sides 137 of the inner end portion of the cylinder 129 by means of a wrist pin 138. Pivotal connection of the links 133 to the distal end portion of the torque arm 134 is by means of a bearing pin 139. To accommodate and clear the arm 134 throughout the full range of operative cranking oscillations of the actuator body 91 about the shaft 95, the head journal tube 98 is provided with a suitable opening 140 machined through that portion of the wall thereof which is internally of the head chamber portion of the body tube 91.

Means are provided for draining off any hydraulic fluid that may leak from the head chamber of the actuator unit along the shaft 95. Fluid leaking into the journal bore 31 passes through a central passage 141 in the shaft 95 extending from its distal end to a cross bore 142 communicating with an annular drain channel 143 in the perimeter of the shaft and with which communicates a drainoff port 144 leading off from between sealing rings 145 laterally through the attachment flange 101 of the journal and closure member 104 and to which is coupled a drainoff duct 147.

In the operation of the actuators 90, they function to move the cover panels 12 and 13 between the closed and open positions depicted in respectively full lines and dot-dash outline in FIGURE 1. When high pressure fluid force is introduced between the crown of the piston 129 and the end closure 119, a cranking torque is generated between the body cylinder tube 91 and the piston 129, and since the actuators 90, in the example shown, are in relatively opposed relation on the common shaft 95, and the torque arms 134 are fixed on the shaft, such hydraulic pressure causes the actuators to move in generally jack-knifing direction about the shaft 95 with a consequent upward thrust of the shaft whereby to cause the associated hatch cover panel sections to jackknife or book correspondingly into open position. Alternatively, when pressure is introduced into the head end portions of the respective actuators and drained from the crown ends of the pistons 129 the reverse reaction occurs to return the actuators to the relative disposition shown wherein the associated cover sections are returned to the closed hatch relationship.

It will be understood that variations and modifications may be effected without departing from the spirit and scope of the novel concepts of this invention.

I claim as my invention:

1. In a construction having an opening such as a hatchway and means for closing the same defining a hinge joint including a nonrotating shaft, and a cover member adapted for movement between closed and open positions about said hinge joint and relative to said opening, and a rotary actuator for effecting said movement, and comprising:

a tubular housing member providing a cylinder;
a piston relatively slidably reciprocably mounted in said cylinder;
a closure on one end of the housing member providing an actuating pressure fluid chamber with the cylinder and the adjacent end of the piston;
a second closure assembled with the opposite end of the housing member and providing an actuating pressure fluid chamber with the cylinder and the opposite end of the piston;
means for alternatively introducing pressure fluid into said chambers;
a torque arm projecting in fixed lateral relation on said shaft;
a hollow head member assembled with said housing member and journalling said shaft on an axis offset from and transverse to the axis of the piston and having a substantial clearance opening for said arm;
link means connecting the piston and said arm;
means securing said head member and said housing member together in fluid-tight relation; and
means securing said housing member to said cover member.

2. A rotary actuator of the character described comprising:

a tubular housing member providing a cylinder;
a piston relatively slidably reciprocably mounted in said cylinder;
a closure on one end of the housing member providing an actuating pressure fluid chamber with the cylinder and the adjacent end of the piston;
a second closure assembled with the opposite end of the housing member and providing an actuating pressure fluid chamber with the cylinder and the opposite end of the piston;
means for alternatively introducing pressure fluid into said chambers;
a shaft having a torque arm projecting rigidly radially therefrom;
link means connecting the piston and torque arm;
a hollow head member assembled with said housing member and journalling said shaft on an axis offset from and transverse to the axis of the piston and having a substantial clearance opening for said arm and link means;
and means fixedly securing said head member and said housing member together.

3. An actuator acording to claim 2, in which said head member comprises a piece of high pressure steel tubing, said housing member comprising a piece of high strength steel tubing having a cutout in which said head member tubing is fitted and said securing means comprising welding.

4. An actuator according to claim 3, in which said head member tubing is of larger diameter than said shaft, and journal closure members secured to the opposite ends of the head member and journalling said shaft.

5. An actuator according to claim 3, in which said head member is spaced a short distance inwardly from the end of said housing member tubing which has said second closure member assembled therewith.

6. In a rotary actuator according to claim 2, said means for introducing pressure fluid comprising respective ports opening through said closures and adapted to have conduits of an operating pressure fluid system connected thereto.

7. In a rotary actuator according to claim 2, said head member being tubular in form and having opposite ends extending laterally of opposite sides of said housing member, and combination end closure and bearing cap and adapter hub members respectively secured in and to said ends of the head member and providing journals for said shaft.

8. In a rotary actuator according to claim 2, the head member having opposite ends, a combination closure flange and bearing member having a blind end inwardly opening journal bore within which a free end of the shaft is received, a combination end closure and shaft journal member mounted on the opposite end of the head member and through which the shaft extends, said shaft having a drainage passage therethrough leading from its free end and in communication with said journal bore, said shaft having an external drainage groove within said enclosure and journal member through which it extends and communicating with said passage, and means providing a drain passage through said enclosure and journal member communicating with said groove.

9. In a rotary actuator according to claim 2, said housing member having in one end thereof an annular inside rabbet groove, one of said closures comprising a concave convex closure dome seated in said groove and secured therein in a pressure-tight assembly with the housing member.

10. In a rotary actuator according to claim 2, said hollow head member comprising a tubular structure having opposite ends, and respective combination bearing cap and adapter hub members secured to said ends having internal bearings providing journals for said shaft and having inner ends confronting respective sides of said arm to maintain the same substantially centered with respect to said cylinder.

References Cited

UNITED STATES PATENTS

| | | | |
|---|---|---|---|
| 2,981,326 | 4/1961 | MacGregor | 160—188 |
| 3,023,629 | 3/1962 | Wagner et al. | 74—105 |
| 3,154,136 | 10/1964 | Ligh | 160—188 |
| 3,288,202 | 11/1966 | Rumsey | 160—188 |

DAVID J. WILLIAMOWSKY, *Primary Examiner.*

PETER M. CAUN, *Assistant Examiner.*